March 25, 1952 C. H. MUTH 2,590,721
FISHING APPARATUS
Filed Nov. 26, 1948
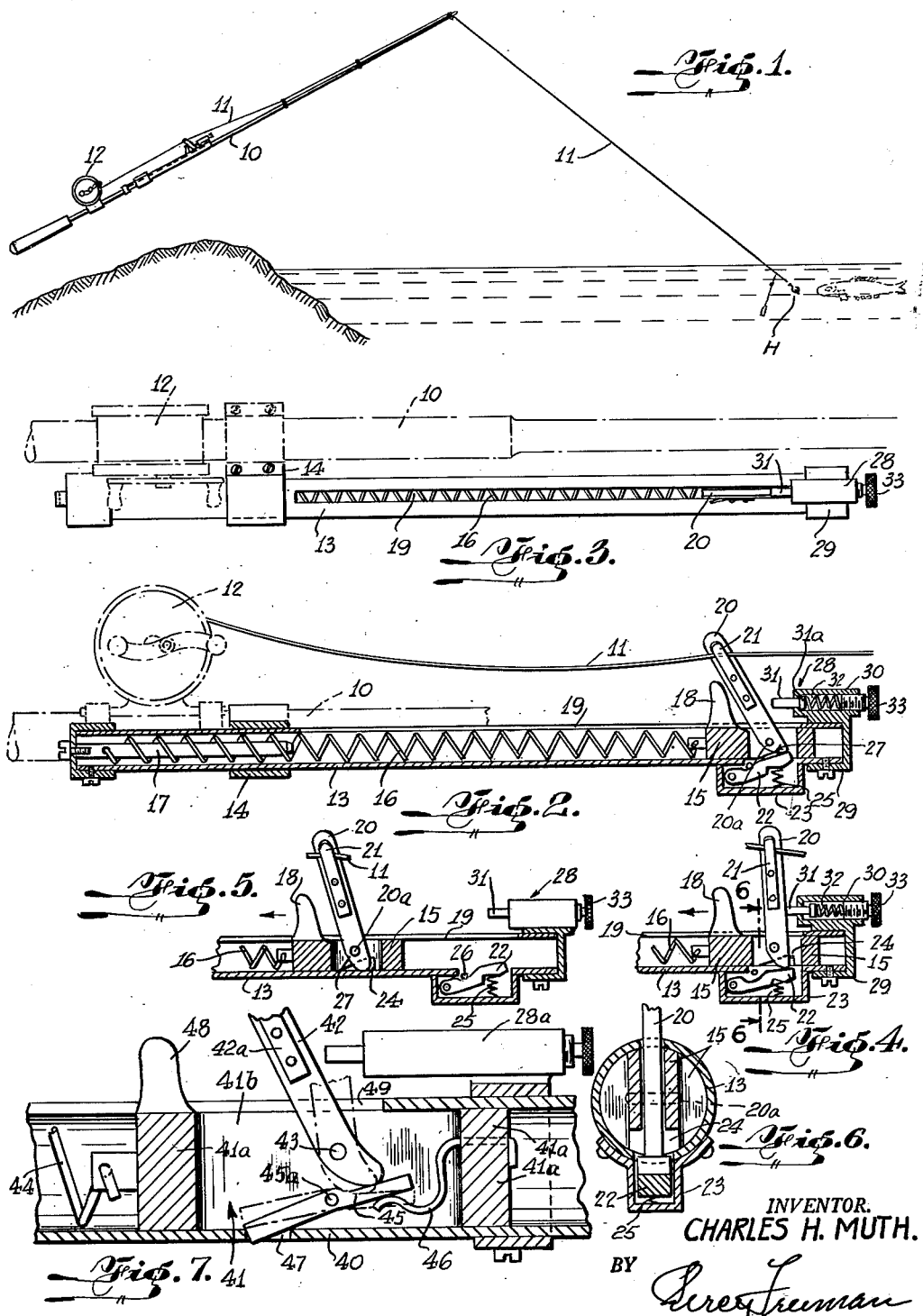
INVENTOR.
CHARLES H. MUTH.
BY
ATTORNEY.

Patented Mar. 25, 1952

2,590,721

UNITED STATES PATENT OFFICE 2,590,721

FISHING APPARATUS

Charles H. Muth, New York, N. Y.

Application November 26, 1948, Serial No. 62,137

6 Claims. (Cl. 43—15)

This invention relates to fishing apparatus and, more particularly, to such apparatus having improved automatic means for jerking or pulling the line as soon as the fish bites in order to securely hook the fish.

It is well known among anglers that successful fishing depends largely upon the split second timing required in jerking in the line as soon as the fish nibbles at the bait so that the fish can be securely hooked before it escapes.

Accordingly it is an object of the invention to provide apparatus of simple design and construction for automatically jerking in the line sufficiently to hook the fish, the apparatus being actuated by the tug on the line cause by the fish itself in making a bite and thereby eliminating the possibility of loss of the fish by the delayed action of the angler in response to the bite of the fish.

Another object of the invention is the provision of apparatus of the character indicated having adjustable control means for predetermining the minimum actuating tension of the apparatus so that not only will the apparatus be unresponsive to normal tugs of small magnitude such as might be occasioned by variations in wind and running current but, in addition, can be made responsive to the bites of fish within a wide range of size and strength.

A further object of the invention is the provision of apparatus of the character indicated which may be fabricated as a separate unit easily and rapidly attachable to fishing rod of conventional construction. While numerous arrangements have been previously proposed for accomplishing the result contemplated by the present invention, it does not appear that any of these previous proposals combine the mode of operation, simplicity, efficiency and adjustability of the present invention with the possibility of attachment of the apparatus to conventional fishing rods without any modification of the rods whatsoever.

The foregoing objects as well as additional objects and advantages of the invention will be readily understood in the course of the following detailed description taken in connection with the accompanying drawing illustrating two modifications of the invention, and wherein:

Fig. 1 is a diagrammatic view illustrating the embodiment of the invention as an apparatus attachable to a conventional fishing rod.

Fig. 2 is a vertical longitudinal sectional view through the apparatus, the fishing rod upon which the apparatus is mounted being shown fragmentarily and in broken outline.

Fig. 3 is a top plan view of the fishing rod (in broken outline) and the apparatus attached thereto, the carriage being shown in extended operative position.

Fig. 4 is a fragmentary detail view of a portion of the apparatus shown in Fig. 2, the carriage being shown at the start of its retracted motion as a result of a sizable operative pull on the line.

Fig. 5 is a similar view illustrating the subsequent retraction of the carriage and the operation of the carriage detent.

Fig. 6 is a transverse sectional view taken along line 6—6 of Fig. 4.

Fig. 7 is a fragmentary longitudinal sectional of a modified form of the invention.

Referring first to Figs. 1-6 of the drawing it will be understood that the fishing rod 10 with which the apparatus may be associated is of any conventional type and includes a fishing line 11 and a winding reel 12 to which said line is fastened.

The body of the device preferably comprises a hollow member or tube 13 which may be secured to the fishing rod 10 in any suitable manner, as by means of one or more mounting brackets 14. Within tube 13 is mounted a slidable carriage 15 which is normally urged rearwardly, i. e. in the direction of the reel 12, by the action of a coil spring 16 secured at one end to the said carriage and at its other end to the rear of tube 13. A guide pin 17 is provided, if desired, to prevent buckling of the spring 16 and the free end of said spring may be anchored within a hole in said guide pin, as shown in Fig. 2.

Carriage 15 is provided with a projection or grip 18 which projects through a longitudinal slot 19 in tube 13 to allow manual manipulations of said carriage to the extended operative position of Fig. 2, as will be fully described hereinafter. An actuating lever 20 is pivoted as at 20a on carriage 15 intermediate its ends and projects upwardly through a slot 19 of tube 13 and externally thereof for a suitable distance. The fishing line 11 is frictionally engaged against lever 20, as by means of a spring clip 21 mounted on said lever. If desired the tension of said clip may be adjusted by means of a set screw (not shown) threaded into lever 20.

Means are provided for releasably engaging the carriage 15 and lever 20 carried thereby in the extended, operative position of Fig. 2 and may take the form of a detent 22 pivoted within a housing 23 suitably fixed to tube 13 and communicating therewith on the side opposite slot 19 adjacent the front end of said tube as shown clearly in Figs. 2, 4 and 5. Detent 22 may be urged upwardly within a recess 24 in the underside of carriage 15 by means of a lightweight spring 25. A pin 26 may be provided within housing 23 to limit the upward movement of detent 22 when carriage 15 retracts, as clearly shown in Fig. 5.

Lever 20 is preferably provided with a cam surface 27 which is disposed against the upper surface of detent 22 when said detent is engaged within the recess 24 of carriage 15 in the extended position of Fig. 2. However, a pull on the line 11 occasioned by the bite of a fish on the baited hook H will move or trip lever 20 forwardly about its pivot 20a, thereby depressing detent 22 by the action of lever cam surface 27 until said detent clears the recess 24, as shown in Fig. 4, whereupon the carriage 15 will be retracted. The retraction of carriage 15 carries the line 11 resulting in a quick pull or jerk on said line and the fish will be securely hooked by the sudden retraction of the line before it can escape.

An important feature of the invention is the provision of means operating against actuating lever 20 to prevent retraction of the carriage 15 below a predetermined minimum tension on the fishing line. The unreeled line is continuously subjected to moderate fluctuating tension by wind, current and the weight of the line itself. Thus it is highly desirable to provide an arrangement for rendering such moderate tensions ineffective for tripping lever 20 and actuating carriage 15. The tension control member 28 may be formed integrally with a cap member 29 closing the forward end of tube 13 and comprises a sleeve 30 carrying a plunger 31 adapted to be urged forwardly against the tension of a spring 32 by the action of the trip-lever 20 in response to a pull on the line. Spring 32 is interposed between the enlarged head 31a of plunger 31 and an adjustment screw 33 threadedly engaged within the forward end of sleeve 30. The effective pull or tension required to retract the carriage 15 by allowing lever 20 to depress detent 22 will therefore be determined by a simple adjustment of screw 33. The adjustment of said screw will depend upon the particular conditions encountered while fishing and upon the type of fishing and upon the type of fish being caught.

The operation of the apparatus is now readily apparent, it being understood that the carriage may be advanced to the extended operative position of Fig. 2 by means of the projecting grip 18. The bite of a fish on hook H resulting in a pull on line 11 will trip lever 20, depressing detent 22 and the carriage will be retracted by spring 16. The sudden pull or jerk on line 11 will securely hook the fish before it can escape. After the carriage 15 has been retracted the line may be pulled in in the usual manner by means of the winding reel 12.

It is to be understood that the modification of Figs. 1–6 may be incorporated, if desired, directly in a fishing rod as a unitary structure rather than as a separate unit for attachment thereto.

The modification of Fig. 7 illustrates the invention incorporated in a fishing rod as a unitary structure. 40 denotes a tubular portion of the rod adjacent the handle (not shown) within which a carriage 41 is slidable. Carriage 41 is preferably formed with cylindrical end sections 41a and an intermediate section 41b provided with a vertical slot for retaining a trip-lever 42 pivoted as at 43 and said carriage is normally urged rearwardly by the action of a coil spring 44 placed under tension and secured at its rear end to the rear end of tube 40. The lower end of lever 42 rests against the upper surface of a detent-lever 45 pivoted at 45a to section 41b and normally urged upwardly to the position of Fig. 7 by means of a leaf spring 46 fastened to end section 41a of carriage 41. When carriage 41 is advanced within tube 40 it is releasably retained in advanced position by means of a transverse slot 47 in the bottom of said tube against the end of which slot the rear end of detent-lever 45 rests. It will be understood that carriage 41 may be advanced by means of a grip 48 projecting upwardly through a longitudinal slot 49 formed in tube 40. The fishing rod is also provided with a winding reel and line (not shown), the line being held frictionally against trip-lever 42 by means of a clip 42a in a manner similar to that described for the initial embodiment. A tension control member 28a is mounted on tube 40 and operates in a similar manner to control member 28 to determine the minimum tension or pull in the line required to actuate the trip-lever 42. Thus when the fish bites, lever 42 is tilted forwardly to depress detent-lever 45 thereby raising the rear end of said detent lever clear of the retaining slot 47 whereupon carriage 41 suddenly retracts and pulls upon the line to securely hook the fish.

Since certain modifications may be made in the apparatus of the invention without departing from the scope thereof, it is intended that all matter contained in the foregoing description and shown in the accompanying drawing be interpreted merely as illustrative and not in a limiting sense.

What is claimed is:

1. In combination with a fishing rod having a winding reel and a fishing line, a device attachable thereto, said device comprising a hollow tubular member having a longitudinal slot therein, a carriage slidable within said member, a spring normally tending to retract said carriage, a spring-urged detent pivotally carried by the tubular member and releasably retaining said carriage in advanced position, a tripping lever pivoted to said carriage and clip means mounted on said lever for frictionally engaging said fishing line, whereby to actuate said tripping lever in response to the pull of a biting fish and suddenly retract said carriage and line to securely hook the fish.

2. In combination with a fishing rod having a winding reel and a fishing line, a device attachable thereto, said device comprising a hollow tubular member having a longitudinal slot therein, a carriage slidable within said member, a spring normally tending to retract said carriage, a spring-urged detent pivotally carried by the tubular member and releasably retaining said carriage in advanced position, a tripping lever pivoted to said carriage and movable against said detent, clip means mounted on said lever for frictionally engaging said fishing line and adjustable control means acting against said lever for predetermining the minimum operative tension required for actuating said lever, said control means comprising a sleeve fixed to said tubular member, a plunger within said sleeve adapted to resist the forward motion of said lever, a spring normally urging said plunger outwardly towards said lever, and an adjustable screw bearing against said spring to vary the tension thereof.

3. In combination with a fishing rod having a winding reel and a fishing line, a hollow tubular member having a longitudinal slot therein, a carriage slidable within said member, a spring normally tending to retract said carriage, a spring-urged detent pivotally mounted on said carriage for releasably retaining said carriage in advanced position, a second slot in said tubular member, the wall of said second slot adapted to retain the end of said detent, a tripping lever pivoted to said carriage and movable against said detent, clip means mounted on said lever for frictionally engaging said fishing line and adjustable control means acting against said lever for predetermining the minimum operative tension for actuating said lever.

4. A structure in accordance with claim 3, said control means comprising a sleeve fixed to said tubular member, a plunger within said sleeve adapted to resist the forward motion of said lever, a spring normally urging said plunger outwardly toward said lever, and an adjustable screw bearing against said spring to vary the tension thereof.

5. A fishing rod comprising a winding reel, a fishing line, a hollow tubular member having a longitudinal slot therein, a carriage member slidable within said tubular member, a spring normally tending to retract said carriage, a spring-urged detent pivotally mounted on one of said members and releasably retaining said carriage in advance position, a tripping lever pivoted to said carriage and movable against said detent, clip means mounted on said lever for frictionally engaging said fishing line and adjustable control means acting against said lever for predetermining the minimum operative tension required for actuating said lever, whereby tension exerted on said line by a biting fish in excess of said predetermined operative tension will actuate said tripping lever and suddenly retract said carriage and line to securely hook the fish.

6. A fishing rod in accordance with claim 5, said control means comprising a sleeve fixed to said tubular member, a plunger within said sleeve adapted to resist the forward motion of said lever, a spring normally urging said plunger outwardly toward said lever, and an adjustable screw bearing against said spring to vary the tension thereof.

CHARLES H. MUTH.

REFERENCES CITED

The following references are of record in the file of this patent:

UNITED STATES PATENTS

| Number | Name | Date |
| --- | --- | --- |
| 154,141 | Hill | Aug. 18, 1874 |
| 263,638 | Wentworth | Aug. 29, 1882 |
| 2,419,378 | Thomas | Apr. 22, 1947 |